United States Patent [19]
Myran

[11] Patent Number: 5,506,958
[45] Date of Patent: Apr. 9, 1996

[54] ERROR DETECTION FOR PARALLEL DATA TRANSFER BETWEEN A PROCESSOR AND A PERIPHERAL DEVICE BY COMPARING REGISGERS STORING A SUM OF VALUES IN BYTES OF DATA TRANSFERRED

[75] Inventor: Mark Myran, Ann Arbor, Mich.

[73] Assignee: Conner Peripherals, Inc., San Jose, Calif.

[21] Appl. No.: 15,784

[22] Filed: Feb. 10, 1993

[51] Int. Cl.[6] .............................. G06F 11/00; G06F 11/30
[52] U.S. Cl. ................................ 395/182.16; 395/185.05; 371/53; 371/37.6; 371/37.7
[58] Field of Search ........................ 371/53, 37.6, 37.7, 371/30; 395/182.16, 185.04, 185.05, 185.07, 185.09

[56] References Cited

U.S. PATENT DOCUMENTS 4,148,098  4/1979  McCreight et al. .................. 364/200
4,413,339  11/1983 Riggle et al. ........................ 371/37
4,451,884  5/1984  Heath et al. ......................... 364/200
4,864,652  9/1989  Austin et al. ........................ 455/617
5,058,110  10/1991 Beach et al. ........................ 370/85.6

FOREIGN PATENT DOCUMENTS 2234093  6/1989  United Kingdom .

Primary Examiner—Hoa T. Nguyen
Attorney, Agent, or Firm—Fliesler, Dubb, Meyer & Lovejoy

[57] ABSTRACT

A method and apparatus for performing error detection on data transfer through a parallel interface port at a substantially increased data transfer rate with a minimum of handshaking. Blocks of data are transferred between a sending device and a receiving device, and each of the respective devices maintains a checksum. Each checksum comprises an initial value, and added to that value is the value of each data byte transferred through the parallel port interface. After a block of data bytes has been transferred, the checksum maintained by the sending device and the receiving device are compared. If the checksums are equal, no error is assumed to have occurred during the data transfer. If the checksums are not equal, an error is assumed to have occurred during the data transfer, and the data is retransferred with the previously transferred block discarded.

6 Claims, 1 Drawing Sheet

ERROR DETECTION FOR PARALLEL DATA
TRANSFER BETWEEN A PROCESSOR AND
A PERIPHERAL DEVICE BY COMPARING
REGISGERS STORING A SUM OF VALUES
IN BYTES OF DATA TRANSFERRED

This invention is directed to a method and apparatus for error detection of data transferred through a parallel port of a computer system. More specifically, this invention is directed to a method and apparatus for detecting errors in data transferred through a parallel port of a computer system where the parallel port data transfer protocol has been modified to include only minimal handshaking in order to increase the data transfer rate.

BACKGROUND OF THE INVENTION

In a great majority of the computer systems in use today there are normally a variety of ports which enable the user to connect any number of external devices to the main unit of the computer. Such devices include printers, modems, floppy disk or tape drives, and mice or other pointing devices to name just a few of a great number of external devices which may be interconnected to computer systems. The interface ports to which these devices connect transfer data to the peripheral device generally in one of two manners, serial or parallel data transfer.

In a serial data transfer, the actual data is transferred from the sending device to the receiving device one data bit at a time. While the serial data transfer interconnection may include a number of control lines, there remains only one data transfer line over which the data is sent in a bit-by-bit manner. In a parallel data transfer, more than one data bit is transferred simultaneously over a plurality of data lines. The number of data bits transferred simultaneously varies depending on the type of interface port and the design of the peripheral device. An entire data byte, or a number of data bytes, may be transferred simultaneously in such a system. Generally, control signals are exchanged between the sending and receiving devices over control lines which are part of the parallel interface connection and prepare the devices for the forthcoming data transfer.

To further describe a parallel port arrangement, a printer (for example) and the computer system to which it attaches often communicate via standard parallel port communications protocol. Such protocol generally includes handshaking between the computer system and the printing device in order to ensure that the sending and receiving devices are prepared for the forthcoming data transfer. The parallel data transfer protocol comprises the sending device informing the receiving device that it is prepared to send the forthcoming data byte. The receiving device responds when it has accepted the data byte. Using such a communications protocol is extremely useful in insuring that the data byte or bytes to be transferred is not transmitted until the sending and the receiving devices are both prepared to carry out their respective rolls in the data transfer. While parallel port data transfer protocol does insure a substantially high degree of integrity in the data transfer, the data transfer rate is substantially slower in a number of parallel port implementations.

When the parallel port of a computer system is used to interface the computer to a device such as a printer, the data rate at which the parallel port operates is normally greater than the speed at which the printing device will operate, so that the limiting factor in the data transfer rate is the speed of the printer and not the data transfer rate inherent to the parallel interface protocol. However, because of the number and variety of external devices which may be interconnected to the computer system, the data transfer rate realizable using standard parallel port interface protocol may often be the limiting factor in the data transfer rate between the computer system and the external device. For example, mass storage devices such as tape backups and hard drives are generally designed for operation internally within the computer system's main unit, where a controller board interconnects the device directly to the computer bus, and the devices operate at a transfer rate much higher than that realizable using standard parallel port communications protocol. Mass storage devices, however, are now more frequently packaged as external devices in order to allow portability between computer systems. Such portability would be desirable to the user who would want to backup a number of computer systems using only one tape drive device transportable between computer systems and connectable to an external data port. This would alleviate the need to provide a backup device at each and every computer system for users having greater than one computer system.

By modifying the communications protocol which directs data transfer through a parallel port, the parallel port data transfer rate may be greatly increased. The increase in data transfer rate results from reducing the amount of handshaking occurring between the sending and receiving device resulting in a greater amount of time being devoted to transferring data rather than performing handshaking operations. A typical scheme known in the art for increasing the data transfer rate through a parallel port during a write operation from the computer to an external device comprises having the external device monitor the data lines for a change in any of the lines to indicate that a new data byte has been transferred. Additionally, a control line is monitored to determine if two identical bytes have been transferred as is indicated when the control line toggles. When the computer system reads a data byte from an external device, the computer determines generally how long it takes for the data to become stable on the lines and enters a short delay loop before reading each individual data byte.

The above described method of data transfer is quite effective in increasing the overall data transfer rate, but provides no method by which the user can insure the integrity of the data transferred. Whereas in a standard parallel interface, a substantially high data transfer integrity results because it is predetermined that both the sending and receiving devices are prepared for the data transfer, the high speed parallel port interface method does not correspondingly ensure that both the sending and receiving transfer devices are prepared because handshaking is greatly reduced. Thus, the integrity of the data transfer is called into question.

SUMMARY OF THE INVENTION

This invention is directed to a method and apparatus for performing error detection on data transferred through a parallel interface port at a substantially increased data transfer rate with a minimum of handshaking. When a block of data is to be transferred via a parallel port interface from a sending device unit to a receiving device at an increased data rate, a first checkvalue is initialized and stored in one of the devices. Similarly, a second checkvalue stored in the other device is initialized by the parallel interface unit to a value equivalent to the first checkvalue. Data is then transferred from the sending device through the parallel port. As each data byte is transferred through the parallel port, the checkvalue associated with the sending device is modified in accordance with the value of the data byte transferred. Similarly, the checkvalue associated with the receiving device is modified in accordance with value of the data byte transferred. At the conclusion of the transfer of a predetermined number of data bytes, the checkvalues are compared. If the checkvalues are identical, data is transferred from temporary to permanent memory if the receiving device is a peripheral controller or is left resident if the receiving device is the computer main unit. If the checkvalues are not identical, the previously transferred block of data is retransferred from the sending to the receiving device.

Further objects, features and advantages of the invention will become apparent from a consideration of the following description and the appended claims when taken in connection with the accompanying drawings.

DETAILED DESCRIPTION OF THE INVENTION

Figure 1:
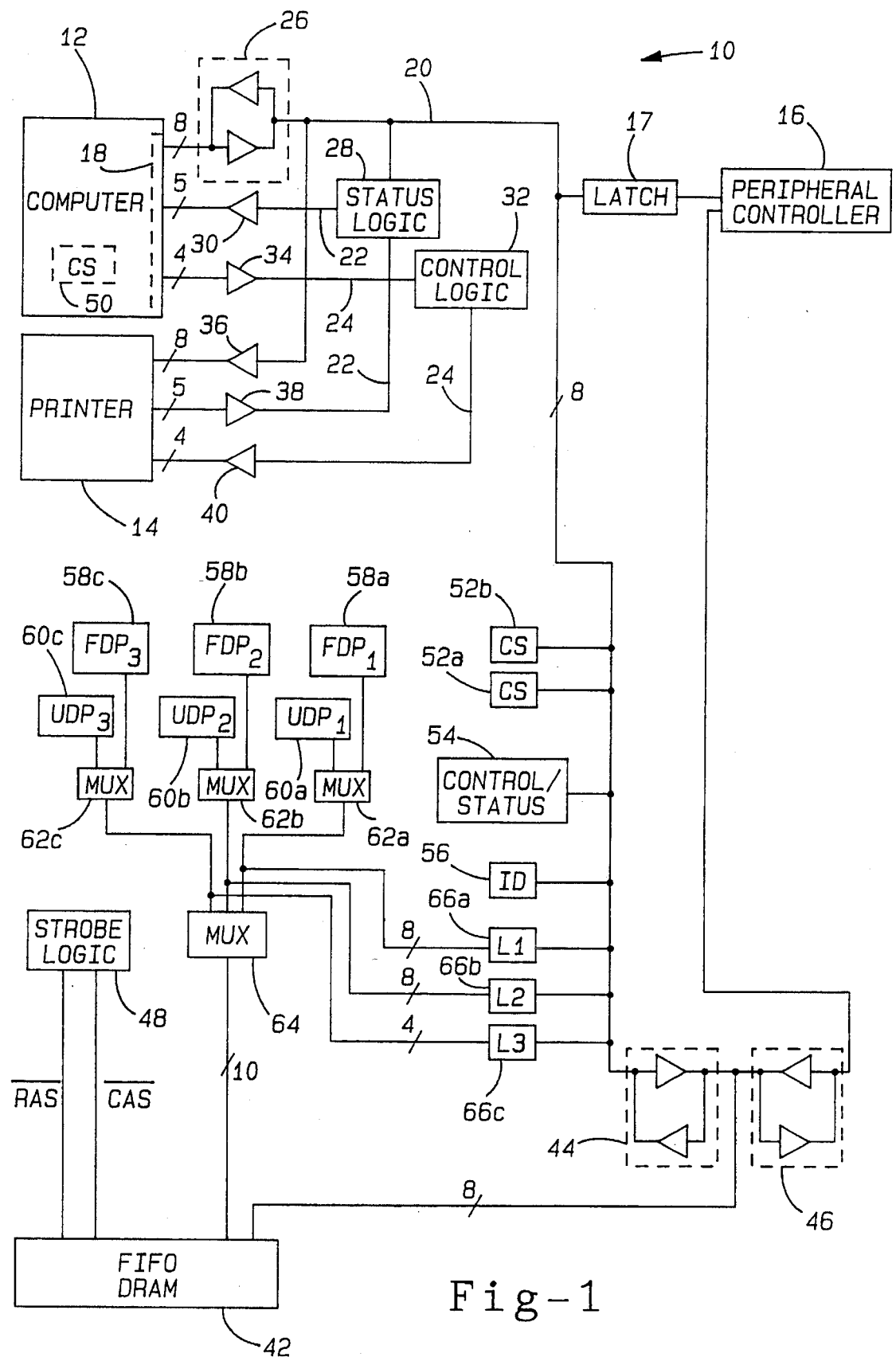
FIG. 1 depicts a block diagram of the parallel port interface error checking circuit.

FIG. 1 depicts a block diagram of the fast parallel port error checking circuit 10. The system includes a computer 12, a printer 14, and a peripheral controller 16, which represents any of a number of external device controllers such as backup tape drives, floppy disk drives, or hard drives. Computer 12 includes parallel port interface 18 which provides an interconnection to printer 14 and peripheral controller 16. Parallel interface 18 includes data lines 20, status lines 22, and control lines 24. Data lines 20 connect to printer 14 and peripheral controller 16 through bi-directional transceiver 26. Status lines 22 are input to parallel interface 18 from status logic 28 through output buffer 30. Parallel interface 18 outputs signals on control lines 24 to control logic 32 through input buffer 34. Similarly, data lines 20 are input to printer 14 through output buffer 36; status signals are output from printer 14 on control lines 22 to status logic 28 through input buffer 38; and control signals are input to printer 14 from control logic 32 over control lines 24 through output buffer 40. It should be noted from the outset that while in the implementation described herein the parallel port interfaces to printer 14 and peripheral controller 16, herein is disclosed only one possible implementation of a high speed parallel port interface with error checking. Several options exist with respect to the presence or absence of printer 14 as well as peripheral controller 16, including multiple devices of each.

In the general operation of fast parallel port data transfer circuit 10, computer 12 and the peripheral controller 16 transfer data through a first-in-first-out (FIFO) memory which is implemented using a dynamic random access memory (DRAM) embodied herein as FIFO DRAM 42. Thus, in a transfer from computer 12 to peripheral controller 16, computer 12 outputs data through parallel interface 18, filling FIFO DRAM 42. When FIFO DRAM 42 is full (128 k bytes in this particular embodiment, but FIFO DRAM 42 may vary in size and need not be full depending on the particular implementation), the contents of FIFO DRAM 42 are then read by peripheral controller 16 via direct memory access (DMA) and transferred to the peripheral device storage media. In order for data to be read and transferred from an external device (not shown) by peripheral controller 16 and transferred to computer 12, the substantially opposite sequence of events occurs. Thus, data is read from the storage media managed by peripheral control 16, and a DMA transfer fills FIFO DRAM 42. Once the transfer from peripheral controller 16 to FIFO DRAM 42 has begun, the contents of FIFO DRAM 42 are then transferred to the memory of computer 12 via parallel port 18. Because a number of peripheral controllers operate on 1 k byte segments, computer 12 does not read FIFO DRAM 42 until 1 k bytes have been written. Other implementations do not require that 1k bytes be written before computer 12 reads FIFO DRAM 42. Note that the transfer between computer 12 and FIFO DRAM 42 or vice versa occurs through bi-directional transceiver 44, and the transfer from peripheral controller 16 and FIFO DRAM 42 or vice versa occurs through bi-directional transceiver 46. Control of FIFO DRAM 42 is effectuated through strobe logic 48, which generates control signals row address strobe ($\overline{RAS}$) and column address stobe ($\overline{CAS}$), and multiplexer 64 which multiplexes the memory address to be written to within FIFO DRAM 42.

Because the data transfer between computer 12 and peripheral device 16 described herein is intended to occur with a minimal amount of handshaking in order to maximize the data transfer rate, this invention implements error checking to ensure the integrity of the data transferred between computer 12 and FIFO DRAM 42 through parallel port 18. Note that data transfers between FIFO DRAM 42 and peripheral controller 16 are assumed to be highly accurate, as that transfer is a DMA transfer and the probability of error is very low.

In order to insure the integrity of data transferred between computer 12 and FIFO DRAM 42, an error checking facility is employed. Specific to this embodiment, a checksum value 50 is determined by computer 12 and a second checksum value is determined by interface circuit 10 using checksum registers 52a and 52b. Checksum register 52b stores the most significant byte and checksum register 52a stores the least significant byte of the checksum value. Checksum value 50 and checksum registers 52a–b are calculated by starting from an initial value, generally zero, and adding to that existing value the value of every data byte transferred between computer 12 and FIFO DRAM 42. A checksum is calculated in the embodiment described herein for every 1 k bytes transferred. After a predetermined number of data bytes have been transferred (1 k bytes in this embodiment), the values of checksum 50 and checksum registers 52a–b are compared to determine if they are equal. If the values are equal, an accurate data transfer between computer 18 and FIFO DRAM 42 is assumed to have occurred, and if the values are unequal, an inaccurate transfer between computer 12 and FIFO DRAM 42 is assumed to have occurred. If the checksum values are not equal, the block of data is transferred again and the previously transferred block is discarded. The system may be designed in such a way that after a predetermined number of inaccurate data transfers, the data transfer rate may be reduced or more handshaking may be employed to increase the accuracy of the data transfer. Such optional methods of data transfer are determined by the user according to system requirements and specifications. Because a number of data transfer modes are available, control status register 54 is used to store the current data transfer mode and status of the system. Also, note that register 56 is an identification register which stores the revision level of the fast parallel port error checking circuit 10. The method of error checking described herein is implemented through the use of checksum values computed for a predetermined number of data bytes, but may optionally be implemented using any of a number of error checking methods well known in the art.

In order to manage FIFO DRAM 42, it is necessary to provide a number of address pointers to maintain the memory position of the next data byte to be read by computer 12 and/or peripheral controller 16. Floppy data pointer (FDP) points at next data byte to be read/written by controller 16 and is embodied herein as a 20 bit word stored in three registers comprising $FDP_1$, $FDP_2$, and $FDP_3$, referred to by reference numerals 58a, 58b, 58c, respectively. FDP1 stores address bits 0–7, FDP2 stores address bits 8–15, and $FDP_3$ stores address bits 16–19. Similarly, user data pointer (UDP) points at the next byte within FIFO DRAM 42 to be read or written by computer 12 and is embodied herein as a 20 bit word stored in three registers $UDP_1$, $UDP_2$, and $UDP_3$, referred to by reference numerals 60a, 60b, and 60c, respectively. The UDP stores the 20 bit word in a manner similar to that described for $FDP_{1-3}$ as described above. The respective address lines for $FDP_{1-3}$ and $UDP_{1-3}$ are multiplexed via multiplexers 62a, 62b and 62c, respectively, such that the address lines for one of either the FDP or UDP are selected for addressing a memory location in FIFO DRAM 42. The selection of address lines by multiplexers 62a–c is determined in accordance with the state of control signals on control lines (not shown) generated by computer 12. The $FDP_{1-3}$ and $UDP_{1-3}$ address registers may be written to and read by computer 12 or peripheral controller 16 by directing control lines (not shown) to latch the contents of the address registers into latches 66a, 66b and 66c. Latches 66a–c enable the addresses to be read using a minimum of time so that the data transfer rate will not be reduced.

Because the memory elements used in this system is a DRAM, random access to the memory occurs on a row and column basis. Half of the 20 address lines define a row within FIFO DRAM 42, and the other half of the 20 address lines define a column within FIFO DRAM 42. The intersection of the row and column define the memory location to be accessed. Therefore, multiplexer 64 selects either the upper half or the lower half of the 20 bit address word in accordance with control signals applied to multiplexer 64 over control lines (not shown) to determine an address row or column within FIFO DRAM 42. Control lines then direct multiplexer 64 to determine the other of the row or column corresponding to the 10 address lines not previously selected. Multiplexing multiplexer 64 in conjunction with the strobe logic 48, which directs the generation of control signals $\overline{RAS}$ and $\overline{CAS}$, selects the address within memory from or to which a data byte will be read or written.

One example of computer 12 writing to peripheral controller 16 will be given below. Computer 12 outputs through parallel interface 18 control signals on control lines 24 which initiate a wake-up sequence within control logic 32. Control logic 32 determines whether computer 12 is initiating a write sequence to printer 14 or a write sequence to peripheral controller 16. If it is determined that a write sequence to peripheral controller 16 is initiated, control lines are appropriately set to initialize checksum 50 and checksum registers 52a–b, FDP registers 58a–c, and UDP registers 60a–c. Control words will then be latched into peripheral controller 16 via latch 17, and control words will be loaded into control/status register 54. Checksum 50 and checksum registers 52a–b are initialized to identical values. After initialization has occurred, computer 12 outputs data through parallel port interface 18 to FIFO DRAM 42 until FIFO DRAM 42 is full or, alternatively, for a predetermined number of bytes. After FIFO DRAM 42 is initially full, peripheral controller begins to read data from FIFO DRAM 42 in the order that computer 12 wrote the data. Thus, after FIFO DRAM 42 is initially full, peripheral controller 16 reads and computer 12 writes data from and to FIFO DRAM 42 on a first come, first served basis.

As computer 12 writes data to FIFO DRAM42, computer 12 also continually updates checksum value 50 by adding the value of each data byte output to FIF0 DRAM 42 to the value of checksum value 50. Similarly, as each data byte is written from computer 12 to FIFO DRAM 42, the value of that data byte is added to the checksum value stored in checksum registers 52a–b. After a predetermined number of bytes have been transferred to FIFO DRAM 42 (1 k bytes in this embodiment), checksum value 50 is then compared to the value of checksum registers 52a–b by computer 12. If the values are identical, an accurate data transfer is assumed to have occurred. If the values are not identical, an error is presumed to have occurred and that block of data that was transferred to FIFO DRAM 42 from computer 12 is sent again and the erroneous block is overwritten. If no errors have occurred, the data is not resent, and will be read by peripheral controller 16 for processing by the peripheral device (not shown). Peripheral controller 16 generally reads data from FIFO DRAM 42 in approximately 1 k byte segments. At the same time that peripheral controller 16 is reading data from the FIFO DRAM 42, computer 18 will continue to write additional data to the Fifo DRAM.

When data is transferred from the peripheral device via peripheral controller 16 to computer 12, the substantially opposite sequence occurs. Thus, after initialization as described above, peripheral controller 16 retrieves data from the storage media and writes that data to FIFO DRAM42 in data blocks of a predetermined size (generally 1 k). After the initial data block has been transferred, computer 12 reads data from FIFO DRAM 42 in the order in which peripheral controller 42 wrote the data. As data is transferred from FIFO DRAM42 to computer 12, checksum registers 52a–b add the value of each data byte transferred to the existing value of the checksum stored in registers 52a–b. Similarly, as data is received via parallel port 18 by computer 12, the value of each data byte is added to checksum value 50. After a predetermined number of bytes have been transferred, the value of checksum registers 52a–b is compared with checksum value 50 to determine if the data transferred from FIFO DRAM 42 to computer 12 has been accurately transferred. If the values are identical, no data errors are assumed to have occurred. If the values are not identical, an unsuccessful data transfer is determined to have occurred, and that block of data is then resent.

If errors are determined to have occurred during the data transfer in either direction between computer 12 and FIFO DRAM 42, the data transfer protocol may be modified in a number of manners to reduce the number of data transfer errors. This modification occurs either through utilizing additional handshaking protocol well known in the art to ensure the sending and receiving device are prepared for the data transfer or reducing the data transfer rate. Furthermore, it should be noted that when the checksum values are compared, standard parallel port interface protocol is used to transfer the checksum values for comparison.

In the above described invention, the use of error checking to ensure the integrity of data transferred via a high speed parallel port data transfer ensures a proper data transfer. Current high speed data transfer systems do increase the data transfer rate obtainable through a parallel port interface, but do not ensure that the data has been properly transferred. By performing error checking to verify data transfer, the increased data transfer rate may be employed with confidence in the data integrity.

It is to be understood that the invention is not limited to the exact construction illustrated and described above, but that various changes and modifications may be made without departing from the spirit and scope of the invention as defined in the following claims.

I claim:

1. A computer system for transferring of data bytes in a number of data transfer modes and providing error detection during transfer of data bytes over parallel data lines, comprising:

parallel data lines;

a processing unit including:
      a parallel interface port connected to the parallel data lines;
      a first checkvalue register connected to receive the value of data bytes transferred from the parallel interface port to the parallel data lines, the first checkvalue register being initialized to store a predetermined value prior to transfer of data bytes from the processing unit over the parallel data lines and increased by a value of each data byte transferred from the processing unit after initialization;
      comparison means for comparing values stored in the first checkvalue register and a second checkvalue register after a predetermined number of data bytes have been transferred from the processing unit to a memory, the comparison means indicating when a match occurred, or when a match did not occur;

an interface circuit including:
      said memory for storing a predetermined number of data bytes, the memory being connected to the parallel data lines;
      said second checkvalue register connected to the parallel data lines to receive data bytes transferred to the memory, the second checkvalue register being initialized to store a predetermined value prior to receipt of data bytes by the memory and increased by a value of each data byte received by the memory after initialization;
      a control status register storing a data transfer mode indication for controlling of a data transfer mode, the control status register being coupled to the processing unit;

a peripheral device including a peripheral controller connected to the memory; and wherein the processing unit causes a transfer of the predetermined number of data bytes from the memory to the peripheral controller when the comparison means indicates a match occurred, retransfers the predetermined number of data bytes from the processing unit to the memory when the comparison means indicates a match did not occur, and causes the control status register to change the data transfer mode indication when the comparison means indicates a match did not occur after the predetermined number of data bytes are retransferred a predetermined number of times.

2. The computer system of claim 6, further comprising a means for overwriting in the memory the predetermined number of data bytes if the comparison means indicates a match did not occur.

3. The computer system of claim 1 wherein the data transfer mode indication indicates a data transfer rate.

4. A method for determining if an error has occurred during the transfer of data bytes over parallel data lines in a computer system which includes a processor connected to the data lines, the processor including a first checkvalue register, the computer system further including an interface unit including a temporary memory and a second checkvalue register each connected to the parallel data lines, and a peripheral device including a peripheral controller connected to the parallel data lines, the method comprising the steps of:

initializing the first checkvalue register to a predetermined value;

initializing the second checkvalue register to the predetermined value;

transferring data bytes from the processor to the memory;

increasing the first checkvalue register by the value of each data byte transferred from the processor;

increasing the second checkvalue register by the value of each data byte transferred to the memory;

comparing the first and second checkvalue registers after a predetermined number of data bytes have been transferred from the processor to the memory to determine if a match has occurred;

transferring the predetermined number of data bytes from the temporary memory to the peripheral controller if it is determined that a match occurred;

retransferring the predetermined number of data bytes from the processor to the memory if it is determined that a match did not occur; and changing a mode of data transfer when a match does not occur after the predetermined number of data bytes are retransferred a predetermined number of times.

5. The method defined by claim 4, further comprising the step of discarding the from the memory the predetermined number of data bytes if a match has not occurred.

6. The computer system of claim 4, wherein the mode of data transfer sets the data transfer rate.

* * * * *